United States Patent Office 3,514,440
Patented May 26, 1970

1

3,514,440
7-EPIMERS OF LINCOMYCIN AND RELATED COMPOUNDS AND PROCESSES FOR MAKING THE SAME
Herman Hoeksema, Kalamazoo, Mich., assignor to The Upjohn Company, Kalamazoo, Mich., a corporation of Delaware
No Drawing. Continuation-in-part of applications Ser. No. 387,776, Aug. 5, 1964, and Ser. No. 463,934, June 14, 1965. This application Jan. 23, 1968, Ser. No. 699,797
Int. Cl. C07c 47/18
U.S. Cl. 260—210
26 Claims

ABSTRACT OF THE DISCLOSURE

6 - amino - 6,8-dideoxy-L-threo-D-galacto-octopyranose compounds of the formula

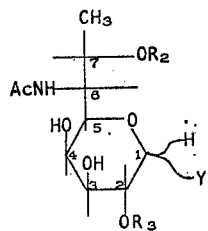

wherein Ac is hydrogen or acyl are prepared from the corresponding 7-epimers (6-amino-6,8-dideoxy-D-erythro-D-galacto-octopyranose compounds) wherein $R_2$ is hydrogen and Ac is acyl by protecting the 3-O- and 4-O-positions, oxidizing the 7-hydroxy to an oxo group, reducing the 7-oxo-group to a hydroxy group, and removing the 3-O- and 4-O-protection, and, if desired, removing the Ac group and, if desired, replacing it by another acyl group. These compounds are useful as antibacterial agents.

CROSS REFERENCES TO RELATED APPLICATIONS

This application is in part a continuation of co-pending applications Ser. No. 387,776, filed Aug. 5, 1964, now U.S. Pat. No. 3,366,624, and Ser. No. 463,934, filed June 14, 1965, and now U.S. Pat. No. 3,380,992.

BRIEF SUMMARY OF INVENTION

This invention relates to 7-epimers of lincomycin and related compounds and to methods for making the same.

The novel compounds of the invention can be represented by the formula

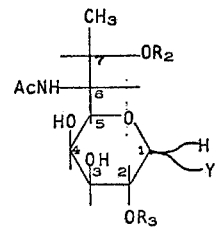

I wherein $R_2$ and $R_3$ are hydrogen or alkyl of not more than 12 carbon atoms, Y is hydrogen, S-alkyl of not more than 12 carbon atoms, or —$SCH_2CH_2OR_4$ wherein $R_4$ is

2 hydrogen or alkyl of not more than 12 carbon atoms, and Ac is hydrogen, alkanoyl or aralkanoyl of not more than 12 carbon atoms or the acyl of a pyrrolidinecarboxylic acid, particularly a pyrrolidinecarboxylic acid of the formula

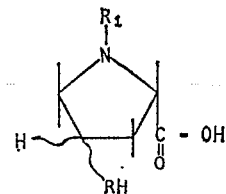

A wherein R is alkylidene of not more than 12 carbon atoms, cycloalkylidene of from 3 to not more than 8 carbon atoms, and aralkylidene of not more than 12 carbon atoms, and $R_1$ is alkyl of not more than 20 carbon atoms, cycloalkyl of from three to not more than 8 carbon atoms, or aralkyl of not more than 12 carbon atoms.

Examples of alkyl of not more than 20 carbon atoms are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl and the isomeric forms thereof. Examples of cycloalkyl are cyclopropyl, cyclobutyl, cyclopentyl, cyclohexyl, cycloheptyl, cyclooctyl, 2-methylcyclopentyl, 2,3-dimethylcyclobutyl, 4 - methylcyclobutyl, and 3 - cyclopentylpropyl. Examples of aralkyl are benzyl, phenethyl, α-phenylpropyl, and α-naphthylmethyl. Examples of alkylidene, cycloalkylidene, and aralkylidene groups include methylene, ethylidene, propylidene, butylidene, pentylidene, hexylidene, heptylidene, octylidene, nonylidene, decylidene, undecylidene, and dodecylidene and the isomeric forms thereof, cyclopropylidene, cyclobutylidene, cyclopentylidene, cyclohexylidene, cycloheptylidene, cyclooctylidene, 2-cyclopropylethylidene, 3-cyclohexylpropylidene, benzylidene, 2 - phenylethylidene, 3-phenylpropylidene, and α-naphthylmethylene.

The novel compounds of the invention can be prepared from the corresponding 7-epimers of the formula:

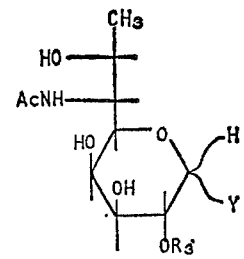

II wherein Ac is an acyl group as given above by protecting the 3-O- and 4-O- positions; oxidizing the 7-hydroxy groups to an oxo group; reducing the 7-oxo group to a hydroxy group; alkylating the 7-hydroxy group, if desired; removing the 3-O- and 4-O- protection; and if desired, removing the acyl group.

The protection of the 3-O- and 4-O- group can be effected by reaction with a trimethylsilylating agent or an oxo compound of the formula $R_5O$ wherein $R_5$ is ylidene group, for example, alkylidene, cycloalkylidene, or aralkylidene as exemplified above. The reaction with the oxo compound can be effected by procedures already well known in sugar chemistry. The protective group can be removed by hydrogenolysis or solvolysis also by procedures already well known in sugar chemistry. The oxidation can be effected by chromic acid or equivalent oxidizing agent and the reduction can be effected with borohydride or equivalent reducing agents. The acyl group can be removed by hydrazinolysis in a manner already known for amino sugars. The mixture of 7-epimers obtained can be separated, if desired, before or after the removal of the protection and before or after the removal of the acyl group.

Suitable starting compounds of Formula II and the preparation thereof are described in the parent applications 387,776 and 463,934.

Alternatively the novel compounds of the invention can be prepared by acylating a compound of Formula I wherein Ac is hydrogen with a pyrrolidinecarboxylic acid. When an acid of Formula A is used, $R_1$ should not be hydrogen.

The starting acid of Formula A can be prepared by the following sequence:

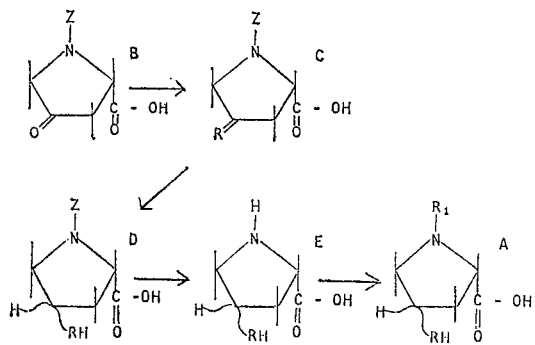

as more fully detailed in the parent applications 387,776 and 463,934.

Alternatively the novel compounds of the invention can be prepared by acylating a compound of Formula I wherein Ac is hydrogen with a pyrrolidinecarboxylic acid of any of Formulae B, C and D and the resulting compound processed to the desired end product by the sequence illustrated above for the acids.

The acylation of the starting compounds of Formula I wherein Ac is hydrogen can be effected by procedures already known for acylating amino sugars or by the procedure detailed in the parent applications 387,776 and 463,934.

In Formulae B, C and D, Z is a protective hydrocarbyloxycarbonyl group which is removable by hydrogenolysis, or trityl (i.e., triphenylmethyl), diphenyl (p-methoxyphenyl)methyl, bis - (p-methoxyphenyl)phenylmethyl, benzyl, or p-nitrobenzyl. Examples of hydrocarbyloxycarbonyl groups are tertiary-butoxycarbonyl; benzyloxycarbonyl groups of the formula:

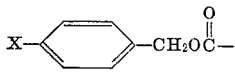

wherein X is hydrogen, nitro, methoxy, chloro, or bromo, for example, carbobenzoxy (benzyloxycarbonyl), p-nitrocarbobenzoxy (p-nitrobenzyloxycarbonyl), p-bromo-, and p-chlorocarbobenzoxy (p-bromo-, and p-chlorobenzyloxycarbonyl); and phenyloxycarbonyl groups of the formula:

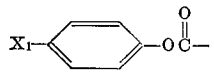

wherein $X_1$ is hydrogen, allyl, or alkyl of not more than 4 carbon atoms, such as phenyloxycarbonyl, p-tolyloxycarbonyl, p-ethylphenyloxycarbonyl, and allyloxycarbonyl.

Various acid-addition salts of the free base form of the compounds of the invention can be made by neutralizing the free base with the appropriate acid to below about pH 7.0, and advantageously to about pH 2 to pH 6. Suitable acids for this purpose include hydrochloric, sulfuric, phosphoric, thiocyanic, fluosilicic, hexafluoroarsenic, hexafluorophosphoric, acetic, succinic, citric, lactic, maleic, furmaric, pamoic, cholic, palmitic, mucic, camphoric, glutaric, glycolic, phthalic, tartaric, lauric, stearic, salicylic, 3-phenylsalicylic, 5-phenylsalicylic, 3-methylglutaric, orthosulfobenzoic, cyclohexanesulfamic, cyclopentanepropionic, 1,2 - cyclohexanedicarboxylic, 4-cyclohexenecarboxylic, octadecenylsuccinic, octenylsuccinic, methanesulfonic, benzenesulfonic, helianthic, Reinecke's, dimethyldithiocarbamic, hexadecylsulfamic, octadecylsulfamic, sorbic, monochloroacetic, undecylenic, 4'-hydroxyazobenzene-4-sulfonic, octyldecylsulfuric, picric, benzoic, cinnamic, and like acids.

The acid-addition salts can be used for the same purposes as the free base or they can be employed to upgrade the same. For example, the free base can be converted to an insoluble salt, such as the picrate, which can be subjected to purification procedures, for example, solvent extractions and washings, chromatography, fractional liquid-liquid extractions, and crystallization and then used to regenerate the free base form by treatment with alkali or to make a different salt by metathesis. Or the free base can be converted to a water-soluble salt, such as the hydrochloride or sulfate and the aqueous solution of the salt extracted with various water-immiscible solvents before regenerating the free base form by treatment of the thus-extracted acid solution or converted to another salt by metathesis.

The compounds of the invention can be used as a buffer or as an antacid. They react with isocyanates to form urethanes and can be used to modify polyurethane resins. The long chain compounds, i.e., where $R_1$ is alkyl of from 8 carbon atoms up, have surface active properties and can be used as wetting asd emulsifying agents. The thiocyanic acid addition salt when condensed with formaldehyde forms resinous materials useful as pickling inhibitors according to U.S. Pats. 2,425,320 and 2,606,155. The free bases also make good vehicles for toxic acids For example, the fluosilicic acid addition salts are useful as mothproofing agents according to U.S. Pats. 1,915,334 and 2,075,359 and the hexafluoroarsenic acid and hexafluorophosphoric acid addition salts are useful as parasiticides according to U.S. Pats. 3,122,536 and 3,122,552.

The close analogues of lincomycin, ie., where RH— is trans-alkyl of not more than 6 carbon atoms; $R_1$ is methyl or ethyl; and Y is α-alkylthio of not more than 6 carbon atoms, have antibacterial properties comparable to but somewhat less than lincomycin and can be used for the same purposes as lincomycin. The other analogues and isomers have similar antibacterial properties but to a lesser degree and can be used for the same purposes as lincomycin where larger amounts are not objectionable.

The following examples are illustrative of the process and products of the present invention but are not to be construed as limiting. The parts and percentages are by weight and the solvent ratios are by volume unless otherwise specified.

EXAMPLE 1

7-epilincomycin (A) 3,4-O-ISOPROPYLIDENELINCOMYCIN

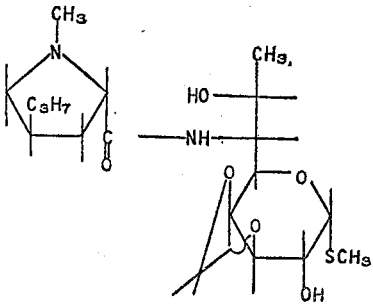

A solution of 9.8 g. of lincomycin in 150 ml. of acetone is added to a solution of 9.8 g of p-toluenesulfonic acid monohydrate in 100 ml. of acetone with good stirring and avoidance of exposure to moisture. The mixture is stirred at ambient temperature for 1 hour, after which 100 ml. of anhydrous ether is added and stirring is continued in an ice-bath for 0.5 hour. The mixture is filtered and the solid is dried in vacuo at 50° C.; yield 13.35 g. (85.5%) of 3,4-O-isopropylidenelincomycin p-toluenesulfonate. An additional 1.15 g. (7.4%) can be recovered from the mother liquors by adding 350 ml. of anhydrous ether to the mother liquor from the previous filtering operation and chilling the solution for 1 hour. The 14.5 g. so obtained are suspended in 200 ml. of ether and shaken vigorously with 125 ml. of 5% potassium bicarbonate solution. The aqueous layer is back-extracted with two 100 ml. portions of ether. The ether extracts are washed with 50 ml. of saturated sodium chloride solution and then filtered through anhydrous sodium sulfate. The ether is evaporated under vacuum, leaving 7.9 g. (73.1%) of 3,4-O-isopropylidenelincomycin which is dissolved in 25 ml. of ethyl acetate and concentrated to about 10 to 15 ml. The concentrate is allowed to stand at room temperature for several hours and then refrigerated overnight. The crystals thus obtained are filtered from the solution and washed sparingly with cold ethyl acetate; yield 4.55 g. (42.2%) of 3,4-O-isopropylidenelincomycin having a melting point of 126–128° C., and an optical rotation of $[\alpha]^{25}+101-102°$ (c., 1, methylene chloride).

(B) 7-DEHYDRO-3,4-O-ISOPROPYLIDENELINCOMYCIN

To a solution of 6 g. (0.0135 moles) of 3,4-O-isopropylidenelincomycin in 75 ml. of pyridine was added 12 g. (excess) of chromium trioxide (chromic acid). The temperature of solution rose about 20° C. After 1 hour the mixture was added to a solution containing 250 ml. each of ethyl ether and ethyl acetate, filtered, and evaporated to 8.4 g. of syrup. This syrup was distributed in a 500-transfer counter current distribution using the system, water:ethyl acetate:ethanol:cyclohexane (1:1:1:1). 7-dehydro-3,4-O-isopropylidenelincomycin was isolated from tubes 330–380, K=2.45.

Analysis.—Calc'd for $C_{31}H_{36}N_2O_6S$ (percent): C, 56.72; H, 8.16; N, 6.30; S, 7.21. Found (percent): C, 56.37; H, 7.62; N, 6.51; S, 6.84.

(C) 3,4-O-ISOPROPYLIDENE-7-EPILINCOMYCIN

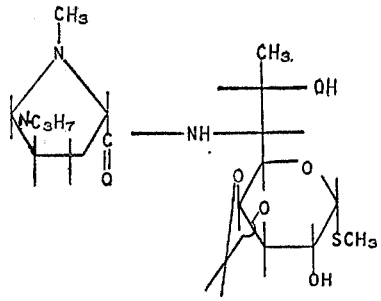

V

To 1.6 g. of Craig pure 7-dehydro-3,4-O-isopropylidenelincomycin in 75 ml. of methanol was added 400 mg. of sodium borohydride. After 1.5 hours this solution was evaporated to dryness on a rotary evaporator. The residue was added to 25 ml. of water which was extracted three times with 25 ml. portions of methylene chloride. The extract was back-washed with 15 ml. of water, dried over magnesium chloride, and evaporated to dryness. The residue, 1.4 g., was distributed in a 500-transfer counter current distribution using the solvent system, water:ethyl acetate:ethanol:cyclohexane (1:1:1:1) and a single peak which fit the theoretical was observed at K=1.05. The material in pooled tubes 240–280 was isolated as a syrup.

Analysis.—Calc'd for $C_{21}H_{38}N_2O_6S$ (percent): C, 56.47; H, 8.58; N, 6.27; S, 7.18. Found (percent): C, 56.24; H, 8.54; N, 6.13; S, 7.01.

Thin layer chromatography (TLC) showed that this material consisted of two substances, one of which was 3,4-O-isopropyl-idenelincomycin. The other, 3,4-O-isopropylidene-7-epilincomycin moved slightly slower.

(D) 7-EPILINCOMYCIN

The syrup from part C was dissolved in a mixture of 60 ml. of 0.25 N hydrochloric acid and 40 ml. of ethanol and allowed to stand at room temperature for 5 hours. The solution was then kept at 0° C. for 4 days, neutralized with sodium bicarbonate, concentrated to 25 ml., and extracted with chloroform. The extract was washed with a little water and dried over magnesium sulfate, then evaporated to a residue. Thin layer chromatography of the residue showed two substances, both of which were active against S. lutea. The residue was chromatographed on a 14″ x ¾″ Florisil (a synthetic silicate of the type described in U.S. Pat. 2,393,625) column which was eluted gradiently with a total volume of 5,000 ml. of solvent which varied continuously from 100% Skellysolve B (technical hexane) to 100% acetone, 40 ml. fractions being collected. Fractions 53–65 yielded 7-epilincomycin, assaying 450 mcg./mg.

Analysis.—Calc'd for $C_{18}H_{34}N_2O_6S$ (percent): C, 50.92; H, 8.55; N, 6.60; S, 7.56. Found (percent): C, 50.19; H, 7.91; N, 6.05; S, 6.42.

Fractions 73–104 yielded lincomycin, assaying 950 mcg./mg.

EXAMPLE 2

Methyl 6-amino-6,8-dideoxy-1-thio-L-threo-α-D-galacto-octopyranoside (methyl 7-epi-α-thiolin-cosaminide)

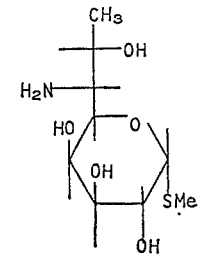

VI

A solution of 40 g. of 7-epilincomycin in 20 ml. of hydrazine hydrate (98–100%) was refluxed for 21 hours; excess hydrazine hydrate was then removed in vacuo under nitrogen at steam bath temperature, leaving a residue. The residue, a pasty mass of crystals, was cooled, acetonitrile was added, and the mixture was stirred until the crystals were suspended. The crystals were collected on a filter, washed with acetonitrile and with ether and dried in vacuo at room temperature. Recrystallization was accomplished by dissolving methyl 7-epi-α-thiolincosaminide in hot dimethylformamide and adding an equal volume of ethylene glycol dimethyl ether.

EXAMPLE 3

Methyl 6-(cis- and trans-4-alkyl-1-alkyl-L-prolylamino)-6,8-dideoxy-1-thio-L-threo-α-D-galacto-octopyranoside (Methyl N(cis- and trans-4-alkyl-1-alkyl-L-prolyl)-7-epi-α-thiolincosaminides)

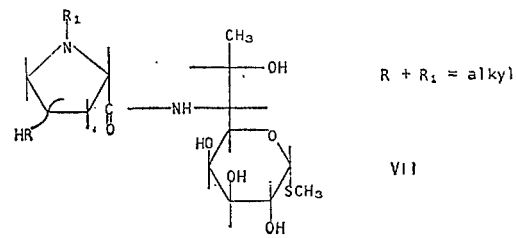

R + R₁ = alkyl

VII

(A) METHYL N-(4-ALKYL-1-CARBOBENZOXY-L-PROLYL-7-EPI-α-THIOLINCOSAMINIDE

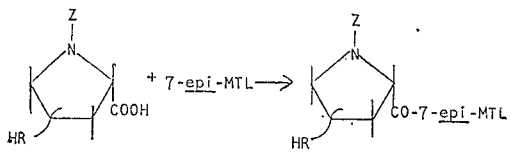

(A-1) METHYL N-(4-BUTYL-1-CARBOBENZOXY-L-PROLYL)-7-EPI-α-THIOLINCOSAMINIDE

To a solution of 6.3 g. of 4-butyl-1-carbobenzoxy-L-proline, preparation of which is given in the parent applications 387,776 and 463,934, in 175 ml. of distilled acetonitrile cooled to 0° was added 3.46 ml. of triethylamine followed by 3.34 ml. of isobutyl chloroformate. The mixture was stirred at 0° C. (±3°) for 15 minutes. A solution of 6.2 g. of methyl-7-epi-α-thiolincosaminide (7-epi-MTL) from Example 2 in 85 ml. of water was added, and the reaction mixture was stirred at 0° C. for 0.5 hour and at 25° C. for 1 hour. The reaction product was then filtered and dried.

(A-2) METHYL N-(4-PENTYL-1-CARBOBENZOXY-L-PROLYL)-7-EPI-α-THIOLINCOSAMINIDE

Following the procedure of Part A-1 substituting the 4-butyl-1-carbobenzoxy-L-proline by 4 - pentyl-1-carbobenzoxy-L-proline, preparation of which is given in the parent applications 387,776 and 463,934, there was obtained methyl N-(4-pentyl-1-carbobenzoxy-L-prolyl)-7-epi-α-triolincosaminide.

(A-3) METHYL N-(4-HEXYL-1-CARBOBENZOXY-L-PROLYL)-7-EPI-α-THIOLINCOSAMINIDE

Following the procedure of Part A-1 substituting the 4-butyl-1-carbobenzoxy-L-proline by 4-hexyl-1-carbobenzoxy-L-proline, preparation of which is given in the parent applications 387,776 and 463,934, there was obtained methyl N-(4-hexyl-1-carbobenzoxy-L-prolyl)-7-epi-α-thiolincosaminide.

(A-4) METHYL N-(4-OCTYL-1-CARBOBENZOXY-L-PROLYL)-7-EPI-α-THIOLINCOSAMINIDE

Following the procedure of Part A-1 substituting the 4-butyl-1-carbobenzoxy-L-proline by 4-octyl-1-carbobenzoxy-L-proline preparation of which is given in the present applications 387,776 and 463,934, there was obtained methyl N-(4-octyl-1-carbobenzoxy-L-prolyl - 7 - epi - α- thiolincosaminide.

(B) METHYL N-(4-ALKYL-L-PROLYL)-7-EPI-α-THIOLINCOSAMINIDE HYDROCHLORIDE

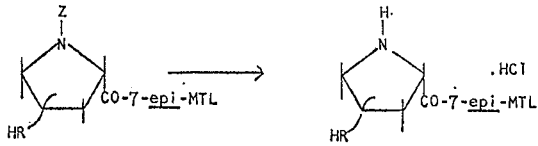

(B-1) METHYL N-(4-BUTYL-L-PROLYL)-7-EPI-α-THIOLINCOSAMINIDE HYDROCHLORIDE

A solution of 7.8 g. of methyl N-(4-butyl-1-carbobenzoxy-L-prolyl)-7-epi-α-thiolincosaminide from Part A-1 in 200 ml. of methanol was shaken over 2 g. of 10% palladium on carbon under 40 pounds of hydrogen pressure for 17 hours. The catalyst was removed by filtration and the solution concentrated under vacuum. The residue was dissolved in a mixture of 20 ml. of acetone and 20 ml. of water and acidified with 6 N hydrochloric acid. Dilution with 4 volumes of acetone precipitated methyl N-(4-butyl-L-prolyl)-7-epi - α - thiolincosaminide hydrochloride which was collected by filtration and dried.

(B-2) METHYL N-(4-PENTYL-I-PROLYL)-7-EPI-α-THIOLINCOSAMINIDE HYDROCHLORIDE

Hydrogenolysis of methyl N-(4-pentyl-1-carbobenzoxy-L-prolyl)-7-epi-α-thiolincosaminide from Part A-2 by the procedure of Part B-1 gave methyl N-(4-pentyl-L-prolyl)-7-epi-α-thiolincosaminide hydrochloride.

(B-3) METHYL N-(4-HEXYL-L-PROLYL)-7-EPI-α-THIOLINCOSAMINIDE HYDROCHLORIDE

Hydrogenolysis of methyl N-(4-hexyl-1-carbobenzoxy-L-prolyl)-7-epi-α-thiolincosaminide from Part A-3 by the procedure of Part B-1 gave methyl N-(4-hexyl-L-prolyl)-7-epi-α-thiolincosaminide hydrochloride.

(B-4) METHYL N-(4-OCTYL-L-PROLYL)-7-EPI-α-THIOLINCOSAMINIDE HYDROCHLORIDE

Hydrogenolysis of methyl N-(4-octyl-1-carbobenzoxy-L-prolyl)-7-epi-α-thiolincosaminide from Part A-4 by the procedure of Part B-1 gave methyl N-(4-octyl-L-prolyl)-7-epi-α-thiolincosaminide hydrochloride.

(C) METHYL N-(4-ALKYL-1-METHYL-L-PROLYL)-7-EPI-α-THIOLINCOSAMINIDE HYDROCHLORIDE

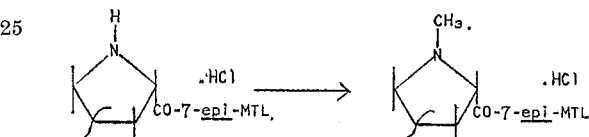

(C-1) METHYL N (4-BUTYL-1-METHYL-L-PROLYL)-7-EPI-α-THIOLINCOSAMINIDE HYDROCHLORIDE

A solution of 2.0 g. of methyl N-(4-butyl-L-prolyl)-7-epi-α-thiolincosaminide hydrochloride from Part B-1 and 2.0 ml. of 37% formalin in 150 ml. of methanol was shaken over 500 mg. of 10% palladium on carbon under 40 pounds of hydrogen pressure for 3.5 hours. Removal of the catalyst by filtration and the solvent by distillation in vacuo yielded partially crystalline methyl N-(4-butyl-1-methyl-L-prolyl)-7-epi - α - thiolincosaminide hydrochloride which was a mixture of two materials, the cis and trans epimers of methyl N-(4-butyl-1-methyl-L-prolyl)-7-epi-α-thiolincosaminide hydrochloride in a ratio of about 3 to 2.

Separation of the cis and trans forms by chromatography.

The methyl N-(4-butyl-1-methyl-L-prolyl)-7-epi - α- thiolincosaminide hydrochloride from Part C-1 was dissolved in a mixture of methanol and methylene chloride (1:1) and 1.5 ml. of triethylamine added. To this solution was added 7 g. of silica gel and the solvent evaporated under vacuum leaving the antibiotic deposited on the silica gel which was sifted on top of a chromatographic column of 200 grams of silica gel packed with a solvent mixture consisting of ethyl acetate, acetone, water in a ratio of 8:4:1. The column was developed with the same solvent and 20 ml. portions were collected and pooled according to the TLC (thin layer chromatography) profile. The faster moving fractions were essentially pure trans epimer and the slower moving fractions were essentially pure cis epimer.

(C-2) METHYL N-(PENTYL-1-METHYL-L-PROLYL)-7-EPI-α-THIOLINCOSAMINIDE HYDROCHLORIDE

Reductive methylation of methyl N-(4-pentyl-L-prolyl)-7-epi-α-thiolincosaminide hydrochloride of Part B-2 by the procedure of Part C-1 gave methyl N-(4-pentyl-1-methyl-L-prolyl) - 7 - epi - α - thiolincosaminide hydrochloride as a mixture of the cis and trans isomers which on partition chromatography by the procedure of Part C-1 gave methyl N-(trans-4-pentyl-1-methyl-L-prolyl)-7-epi - α - thiolincosaminide hydrochloride and methyl N-(cis-4-pentyl-1-methyl-L-prolyl) - 7 - epi - α- thiolincosaminide hydrochloride.

(C-3) METHYL N-(4-HEXYL-1-METHYL-L-PROLYL)-7-EPI-α-THIOLINCOSAMINIDE HYDROCHLORIDE

Reductive methylation of methyl N-(4-hexyl-L-prolyl)-7-epi-α-thiolincosaminide hydrochloride of Part B-3 and chromatographic separation of the isomers by the procedure of Part C-1 gave methyl N-trans-4-hexyl-1-methyl-L-prolyl)-7-epi-α-thiolincosaminide hydrochloride and methyl N-(cis-4-hexyl-1-methyl-L-prolyl)-7-epi - α-thiolincosaminide hydrochloride.

(C-4) METHYL N-(4-OCTYL-1-METHYL-L-PROLYL)-7-EPI-α-THIOLINCOSAMINIDE HYDROCHLORIDE

Reductive methylation of methyl N-(4-octyl-L-prolyl)-7-epi-α-thiolincosaminide hydrochloride of Part B-4 and chromatographic separation of the isomers by the procedure of Part C-1 gave methyl N-(trans-4-octyl-1-methyl-L-prolyl)-7-epi-α-thiolincosaminide hydrochloride and methyl N-(cis-4-octyl-1-methyl-L-prolyl)-7-epi-α-thiolincosaminide hydrochloride.

(D) METHYL N-(4-ALKYL-1-ETHYL-L-PROLYL)-α-THIOLINCOSAMINIDE HYDROCHLORIDE

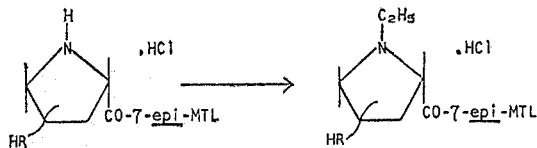

(D-1) METHYL N-(4-BUTYL-1-ETHYL-L-PROLYL)-7-EPI-α-THIOLINCOSAMINIDE HYDROCHLORIDE

A mixture of 2.0 g. of methyl N-(4-butyl-L-prolyl)-7-epi-α-thiolincosaminide hydrochloride of Part C-1, 1.5 ml. of acetaldehyde, and 150 mg. of 10% palladium on carbon in 150 ml. of methanol was shaken under 35 pounds of hydrogen pressure for 5.5 hours. The catalyst was removed by filtration to give a residue consisting chiefly of the cis and trans epimers of methyl N-(4-butyl - 1-ethyl-L-prolyl)-7-epi-α-thiolincosaminide hydrochloride.

Separation of epimers.—As described in Part C-1, the mixture of epimers of Part D-1, was chromatographed over silica gel using for elution a solvent system of ethyl acetate, acetone, water (8:4:1). The faster moving fractions were essentially pure trans epimer and slower moving fractions were essentially pure cis epimer.

(D-2) METHYL N-(4-PENTYL-1-ETHYL-L-PROLYL)-7-EPI-α-THIOLINCOSAMINIDE HYDROCHLORIDE

Reductive ethylation and separation by the procedure of Part D-1 of- N-(4-hexyl-L-prolyl)-7-epi-α-thiolincosaminide hydrochloride of Part C-2 gave the cis and trans epimers as the free bases and hydrochlorides.

(D-3) METHYL N-(4-HEXYL-1-ETHYL-L-PROLYL)-7-EPI-α-THIOLINCOSAMINIDE HYDROCHLORIDE

Reductive ethylation and separation by the procedure of Part D-1 of ---(4-hexy-L-prolyl)-7-epi-α-thiolincosaminide hydrochloride of Part C-3 gave cis and trans epimers as the free bases and the hydrochlorides.

(D-4) METHYL N-(4-OCTYL-1-ETHYL-L-PROLYL)-7-EPI-α-THIOLINCOSAMINIDE HYDROCHLORIDE

Reductive ethylation and separation by the procedure of Part D-1 of N-(4-octyl-L-prolyl)-7-epi-α-thiolincosaminide hydrochloride gave the cis and trans epimers as the free bases and the hydrochlorides.

By substituting the 4-alkyl-1-carbobenzoxy-L-prolines of Part A in the above example by other 4-substituted 1-carbobenzoxy-L-prolines where the substituent is methyl, ethyl, propyl, heptyl, nonyl, decyl, undecyl, and dodecyl, and the isomeric forms thereof (as well as the isomeric forms of butyl, pentyl, and hexyl), cyclopropyl, cyclobutyl, cyclopentyl, cyclohexyl, cycloheptyl, cyclooctyl, 2-cyclopropylethyl, 3-cyclohexylpropyl, benzyl, phenethyl, 3-phenylpropyl, and 1-naphthylmethyl, the corresponding methyl N-(cis- and trans-4-alkyl-, 4-cycloalkyl-, and 4 - aralkyl-1-carbobenzoxy-L-prolyl)-7-epi-α-thiolincosaminides, the corresponding methyl N-(cis- and trans-4-alkyl-, 4-cycloalkyl-, and 4-aralkyl-L-prolyl) - 7 - epi-α-thiolincosaminides; the corresponding methyl N-(cis- and trans-4-alkyl-, 4-cycloalkyl-, and 4 - aralkyl-1-methyl-L-prolyl)-7-epi-α-thiolincosaminides and the corresponding methyl N-(cis- and trans-4-alkyl-, 4 - cycloalkyl-, and 4-aralkyl-1-ethyl-L-prolyl)-7-epi-α-thiolincosaminides are obtained. For example, when propyltriphenylphosphonium bromide and formalin are used both 7-epi-lincomycin and 7-epi-allolincomycin (the cis-epimer) are obtained. By substituting the formalin or acetaldehyde by other oxo compounds of the formula $R_8R_9CO$, for example, propionaldhyde, acetone, butyraldehyde, isobutyl methyl ketone, benzaldehyde, phenylacetaldehyde, hydrocinnamaldehyde, acetophenone, propiophenone, butyrophenone, 3-methyl-4-phenyl-2-butanone, 2-methyl-5-phenyl-3-pentanone, 3-cyclopentanepropionaldehyde, cyclohexaneacetaldehyde, cycloheptanecarboxaldehyde, 2,2-dimethylcyclopropaneacetaldehyde, 2,2 - dimethylcyclopropyl methyl ketone, cyclopentyl methyl ketone, cyclobutyl methyl ketone, cyclobutanone, cyclohexanone, and 4-methylcyclohexanone, the corresponding methyl N-(cis- and trans-4 - alkyl-, 4-cycloalkyl-, and 4 - aralkyl-1-$R_8R_9CH$-L-prolyl)-7-epi-α-thiolincosaminides where $R_8R_9CH$— is propyl, isopropyl, butyl, 4-methyl-2-pentyl, benzyl, phenethyl, 3-phenylpropyl, 1-phenylethyl, 1-phenylpropyl, 1 - phenylbutyl, 3-methyl-4-phenyl-2-butyl, 2-methyl-5-phenyl-3-pentyl, 3-cyclopentylpropyl, 2-cyclohexylethyl, cyclobutylethyl, cyclobutyl, cyclohexyl, and 4-methyl-(2,2-dimethylcyclopropyl)ethyl, 1-cyclopentylethyl, 1-cyclobutylethyl, cyclobutyl, cyclohexpl, and 4-methyl-cyclohexyl are obtained. For example, when ethyltriphenylphosphonium bromide and acetaldehyde are used, the antibiotically active methyl (6-trans-4-ethyl-L-prolylamino) - 6,8-dideoxy-1-thio-L-threo-α-D-galacto-octopyranoside, methyl 6-(trans-1,4-diethyl-L-prolylamino)-6,8-dideoxy-1-thio-L-threo-α-D-galacto-octopyranoside and the cis forms thereof are obtained.

By substituting the methyl 7-epi-α-thiolincosaminide by other 7-epi-α-thiolincosaminides or by 7-epi-β-thiolincosaminides or generally by other 6,8-dideoxy-6-amino-L-threo-D-galactooctopyranose compounds of Formula I wherein Ac is hydrogen, the corresponding amides of Formula I wherein Ac is the acyl are obtained.

EXAMPLE 4

*Preparation of 7-epi-allolincomycin*

(A) METHYL N - (4-PROPYLIDENE-1-CARBOBENZOXY-L-PROLYL)-7-EPI-α-THIOLINCOSAMINIDE

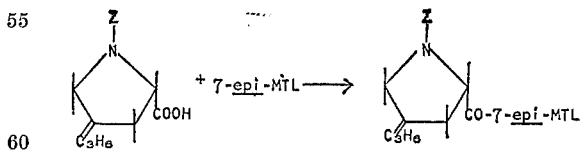

To a solution of 2.25 g. of 4-propylidene-1-carbobenzoxy-L-proline, preparation of which is given in the parent applications 387,776 and 463,934, and 1.40 ml. of triethylamine in 80 ml. of distilled acetonitrile cooled to 0° there was added 1.08 ml. of isobutyl chloroformate in 1 ml. of acetonitrile. The mixture was stirred at 0° (±5°) for 15 minutes. A solution of 2.92 g. of methyl 7-epi-α-thiolincosaminide (7-epi-MTL) in 100 ml. of water was added rapidly. The resulting solution was stirred at 0° for 1 hour, the cooling bath removed and stirring continued for another hour. The acetonitrile was removed by distillation under vacuum, leaving a partially crystalline residue. The mixture was cooled to 10° and filtered and the product was dried at 55° under vacuum to yield methyl N-(4-propylidene-1-carbobenzoxy-L-prolyl)-7-epi-α-thiolincosaminide.

(B) METHYL N-(4-PROPYL-L-PROLYL)7-EPI-α-THIOLINCOSAMINIDE HYDROCHLORIDE

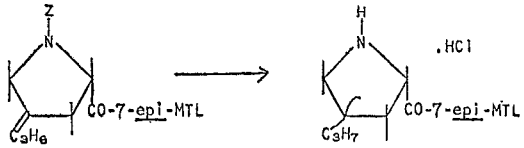

A solution of 100 mg. of methyl N-(4-propylidene-1-carbobenzoxy-L-prolyl)-7 - epi-α-thiolincosaminide from Part A in 50 ml. of methanol was shaken over 100 mg. of 7% platinum on Dowex-1 under 40 pounds of hydrogen pressure for 3 hours. There was then added 100 mg. of 10% palladium on charcoal and the reaction mixture was shaken under 40 pounds pressure for another 3 hours. The catalyst was removed by filtration and the solvent was removed under vacuum. The residue was dissolved in 0.1 ml. of 0.5 N hydrochloric acid. Dilution with 15.0 ml. of acetone precipitated methyl N-(4-propyl-L-prolyl)-7-epi-α - thiolincosaminide hydrochloride, which was collected by filtration and dried at 55° C. under vacuum. The product contained about 4 parts of the cis isomer for each part of the trans isomer.

(C) METHYL N-(4-PROPYL-1-METHYL-L-PROLYL)-7-EPI-α-THIOLINCOSAMINIDE HYDROCHLORIDE

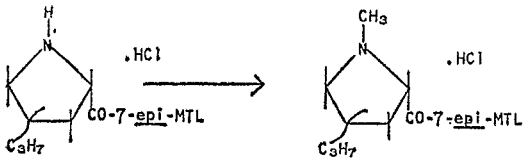

A solution of 100 mg. of methyl N-(4-propyl-L-prolyl)-7-epi-α-thiolincosaminide hydrochloride from Part B and 0.2 ml. of formalin in 50 ml. of methanol was shaken over 100 mg. of 10% palladium on carbon under 40 pounds of hydrogen pressure for 5 hours. The catalyst was removed by filtration and the solvent was removed in vacuo. The residue showed 2 spots on TLC (thin layer chromatography), one being 7-epi-lincomycin hydrochloride, the other being 7-epi-allolincomycin hydrochloride.

(D) SEPARATION OF THE CIS AND TRANS FORMS BY CHROMATOGRAPHY

One gram of methyl N-(4-propyl-1-methyl-L-prolyl)-7-epi-α-thiolincosaminide hydrochloride from Part C is dissolved in 15–20 ml. of methylene chloride containing 0.5 ml. of triethylamine and 2 g. of silica gel for chromatography added. The solvent is evaporated under vacuum leaving the antibiotic deposited on the free-flowing silica gel. One hundred grams of silica gel is slurried with 80% aqueous acetone and poured in a chromatographic column. The solvent is drained down to the level of the gel. The sample of compound deposited on silica gel is dusted on top of the column followed by a layer of sand. The column is eluted with 80% aqueous acetone and fractions of 20 ml. are collected. A sample of each is evaporated to dryness and assayed by TLC on silica gel using 80% aqueous acetone as the eluting solvent. The antibiotic is detected by spraying with alkaline permanganate is solution. The fractions containing the desired products are combined, evaporated to dryness, and the antibiotic crystallized as the hydrochloride by dissolving in excess dilute hydrochloric acid and diluting with acetone. The trans isomer is eluted first followed by a mixture of cis and trans isomers and finally pure cis isomer.

By substituting the 4-propylidene-1-carbobenzoxy-L-proline of Part A in the above example by other 4-substituted 1-carbobenzoxy-L-prolines where the substituent is butylidene, pentylidene, hexylidene, heptylidene, octylidene, nonylidene, decylidene, undecylidene, and dodecylidene and the isomeric forms thereof as well as methylidene, ethylidene, and isopropylidene, cyclopropylidene, cyclobutylidene, cyclopentylidene, cyclohexylidene, cycloheptylidene, cyclooctylidene, 2-cyclopropylethylidene, 3-cyclohexylpropylidene, benzylidene, phenethylidene, 3-phenylpropylidene, and α-naphthylmethylidene, the corresponding methyl N-(cis and trans-4-alkylidene, cycloalkylidene-, and aralkylidene-1-carbobenzoxy-L-prolyl)-7-epi-α-thiolincosaminides, the corresponding methyl N-(cis and trans-4-alkyl, cycloalkyl-, and aralkyl-L-prolyl)-7-epi-α-thiolincosaminides, and the corresponding N-(cis and trans-4-alkyl-, cycloalkyl-, and aralkyl-1-methyl-L-prolyl)-7-epi-α-thiolincosaminides are obtained. By substituting the formalin of Part C by other oxo compounds of the formula $R_8R_9CO$, for example, acetaldehyde, propionaldehyde, acetone, butyraldehyde, isobutyl methyl ketone (4-methyl-2-pentanone), benzaldehyde, phenylacetaldehyde, hydrocinnamaldehyde, acetophenone, propionphenone, butyrophenone, 3-methyl-4-phenyl-2-butanone, 2-methyl-5-phenyl-3-pentanone, 3-cyclopentanepropionaldehyde, cyclohexaneacetaldehyde, cycloheptanecarboxaldehyde, 2,2-dimethylcyclopropaneacetaldehyde, 2,2-dimethylcyclopropyl methyl ketone, cyclopentyl methyl ketone, cyclobutyl methyl ketone, cyclobutanone, cyclohexanone, and 4-methylcyclohexanone, the corresponding methyl N-(cis and trans-4-alkyl-, 4-cycloalkyl-, and 4-aralkyl-1-$R_8R_9$CH-L-prolyl)-7-epi-α-thiolincosaminides where $R_8R_9$CH— is ethyl, propyl, isopropyl, butyl, 4-methyl-2-pentyl, benzyl, phenethyl, 3-phenylpropyl, 1-phenylethyl, 1-phenylpropyl, 1-phenylbutyl, 3-methyl-4-phenyl-2-butyl, 2-methyl-5-phenyl-3-pentyl, 3-cyclopentylpropyl, 2-cyclohexylethyl, cycloheptylmethyl, 2-(2,2-dimethylcyclopropyl)ethyl, 1-(2,2-dimethylcyclopropyl)ethyl, 1-cyclopentylethyl, 1-cyclobutylethyl, cyclobutyl, cyclohexyl, and 4-methylcyclohexyl are obtained.

By substituting the methyl 7-epi-α-thiolincosaminide by other 7-epi-α-thiolincosaminides or by 7-epi-β-thiolincosaminides or generally by other 6,8-dideoxy-6-amino-L-threo-D-galacto-octopyranose compounds of Formula I wherein Ac is hydrogen, the corresponding amides of Formula I where Ac is the acyl are obtained.

EXAMPLE 5

Alkyl 7-epi-α-thiolincosaminide

Following the procedure of Examples 1 and 2 substituting the lincomycin by lincomycin C, there is obtained ethyl 7-epi-α-thiolincosaminide. By substituting other 7-alkyl-S-dimethyl lincomycin analogs, preparation of which are given in the parent applications 387,776 and 463,934, there are obtained the corresponding alkyl 7-epi-α-thiolincosaminides. The alkyl can be propyl, butyl, pentyl, hexyl or higher including the isomeric forms thereof.

Following the procedure of Example 3 substituting the methyl 7-epi-α-thiolincosaminide by ethyl 7-epi-α-thiolincosaminide, compounds of Formula I wherein Y is —$SCH_2CH_3$ in the α-configuration are obtained. For example, when 4 - substituted-1-carbobenzoxy-L-prolines and formalin or acetaldehyde are used, antibiotically active ethyl 6-(trans-4-substituted-L-prolylamino)-6,8-dideoxy - 1 - thio-L-threo-α-D-galacto-octopyranosides and the cis forms thereof are obtained where the prolyl substituents are 4-alkyl, 4-alkyl-1-methyl, and 4-alkyl-1-ethyl, where alkyl can be ethyl, propyl, butyl, pentyl, and hexyl, or the isomeric forms thereof. By substituting other alkyl 7-epi-α-thiolincosaminides as given above, the corresponding alkyl 6-(trans-4-substituted - 6-prolyl-amino)-6,8-dideoxy-1-thio-L-threo - α - D-galacto-octopyranosides and the cis forms thereof, are obtained where the prolyl substituents are as given above.

EXAMPLE 6

*Alkyl, 2-hydroxyethyl, and 2-alkoxyethyl, 7-epi-β-thiolincosaminides*

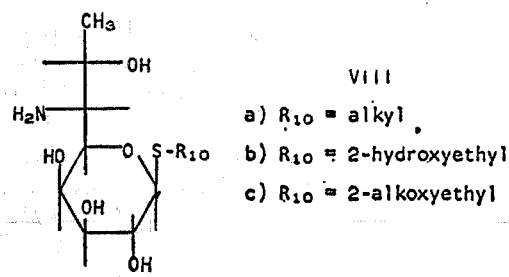

VIII
a) $R_{10}$ = alkyl,
b) $R_{10}$ = 2-hydroxyethyl
c) $R_{10}$ = 2-alkoxyethyl Following the procedure of Examples 1 and 2 substituting the lincomycin by alkyl, 2-hydroxyethyl and 2-alkoxyethyl-N-acetyl-β-thiolincosaminide, preparation of which is given in the parent applications 387,776 and 463,934, there are obtained alkyl, 2-hydroxy, and 2-alkoxyethyl 7-epi-β-thiolincosaminides. The alkyl of the alkoxy can be methyl, ethyl, propyl, butyl, pentyl, hexyl, heptyl, octyl, nonyl, decyl, undecyl, or dodecyl or the isomeric forms thereof.

EXAMPLE 7

6-AMINO - 1,6,8 - TRIDEOXY-L-THREO-D-GALACTO-OCTOPYRANOSE-(7-EPI-1-DEOXYLINCOSAMINE)

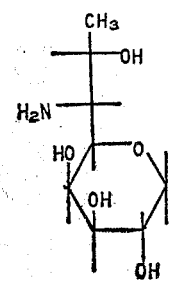

IX

Following the procedure of Examples 1 and 2 substituting the lincomycin by N-acetyl-3,4-O-isopropylidene-1-deoxylincosamine, preparation of which is given in the parent applications 387,776 and 463,934, there is obtained 6 - amino - 1,6,8-trideoxy-L-threo-D-galacto-octopyranose.

On substituting the 7-epi-α and β-thiolincosaminide in the above processes by 6-amino-1,6,8-trideoxy-L-threo-D-galacto-octopyranose compounds of the formula:

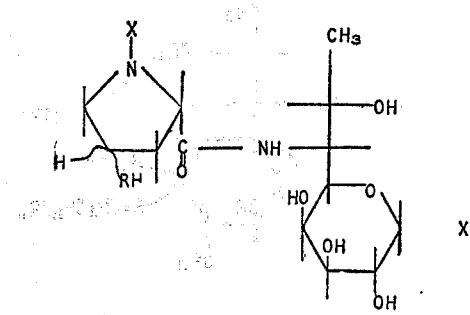

X wherein $X = R_1$ or Z as given above and R is as given above are obtained.

Following the procedure of Examples 1 and 2 substituting the lincomycin by methyl N-acetyl-2-O-methyl-α-thiolincosaminide, preparation of which is given in the parent applications 387,776 and 463,934, alkyl 2-O-methyl 7-epi-α-thiolincosaminide is obtained and substituting the compounds thus obtained for 7-epi-α-thiolincosaminide in the above processes, compounds of the Formula I

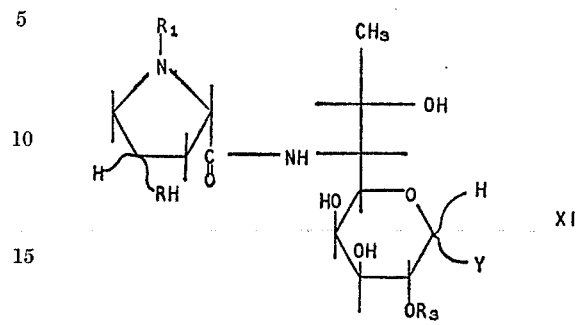

XI wherein R, $R_1$ and Y are as given above and $R_3$ is alkyl are obtained.

EXAMPLE 8

*2-O and 7-O-alkylation of alkyl 7-epi-α- and β-thiolincosaminides*

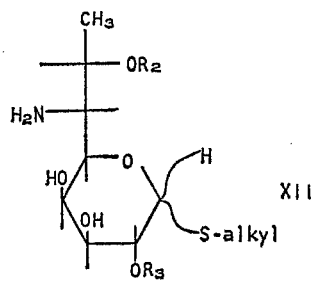

XII (A) METHYL N-ACETYL-3,4-O-ISOPROPYLIDENE 7-EPI-α-THIOLINCOSAMINIDE

Sixteen grams of methyl N - acetyl-7-epi-α-thiolincosaminide was finely powdered and suspended in 1600 ml. of dry acetone with rapid magnetic stirring. To this suspension was added 16 ml. of concentrated sulfuric acid. The suspended solid began to dissolve and solution was complete within 30 to 60 minutes. After standing for 3 hours at room temperature (24–26° C.), the solution was cooled overnight in a refrigerator at about 5 to 10° C.

The pale yellow solution was neutralized by introducing, with stirring, a stream of dry ammonia gas. Ammonium sulfate precipitated and was removed by filtration and washed with acetone. The acetone washing was added to the colorless filtrate which was evaporated on a rotating evaporator at 30° C. and 15 mm. Hg pressure to yield a mixture of syrup and crystalline solids. The syrup was dissolved by swirling the mixture with 50 ml. of water, and the crystalline solid was collected on a filter and washed with ice-cold water. Recrystallization from acetone-Skellysolve B hexanes gave colorless needles of the oxazoline derived from methyl N-acetyl-3,4-O-isopropylidene-7-epi-α-thiolincosaminide. The filtrate was concentrated in vacuo to give methyl N-acetyl-3,4-O-isopropylidene-7-epi - α - thiolincosaminide which was recrystallized from acetone.

(B) CONVERSION OF THE OXAZOLINE DERIVED FROM METHYL N - ACETYL-3,4-O-ISOPROPYLIDENE-7-EPI-α-THIOLINCOSAMINIDE TO METHYL N-ACETYL-3,4-O-ISOPROPYLIDENE-7-EPI-α-THIOLINCOSAMINIDE

A solution was prepared of the oxazoline derived from methyl N - acetyl-3,4-O-isopropylidene-7-epi-α-thiolincosaminide in 20 ml. of hot water and heated under reflux for 2 hours at which time thin-layer chromatography on silica gel revealed the conversion of the starting material to methyl N - acetyl-3,4-O-isopropylidene-7-epi-α-thiolincosaminide. The water was then removed in vacuo at 40° C., leaving a colorless crystalline solid which was recrystallized from a small volume of hot water to give colorless needles of methyl N - acetyl-3,4-O-isopropylidene-7-epi-α-thiolincosaminide.

(C) METHYLATION OF METHYL N-ACETYL-3,4-O-ISOPROPYLIDENE-7-EPI-α-THIOLINCOSAMINIDE

Potassium metal (1.16 g.) was dissolved in 100 ml. of t-butyl alcohol (previously dried over sodium metal) under stirring and reflux. The solvent was removed as completely as possible by distillation and finally by distillation in a vacuum of 15 mm. Hg. To the dry, solid residue was added 100 ml. of dry benzene, which was removed by distillation to leave a fine powder. This was treated again with benzene which was distilled off to insure complete removal of tert-butyl alcohol.

To the thus-obtained, powdery potassium tert-butoxide was added 200 ml. of dry benzene and the mixture was stirred magnetically at room temperature until an opalescent suspension resulted. To this was added 5 g. of methyl N-acetyl-3,4-O-isopropylidene - 7 - epi - α - thiolincosaminide and the mixture was then stirred overnight at room temperature at the end of which time all of the solid had dissolved.

To this mixture was added 42.4 g. (18.6 ml.) of methyl iodide and the mixture was stirred at room temperature for 1½ hours; after 1 hour, the mixture gave a neutral reaction with moist pH paper. The reaction mixture was filtered to remove potassium iodide and the potassium iodide was washed with benzene; the benzene was added to the filtrate. The filtrate and washings were distilled in vacuo at 35° C. to give a colorless syrup which was subjected to counter current distribution in the system ethyl acetate:ethanol:water in the ratio 4:1:2. After 500 transfers the three components, as indicated by thin-layer chromatography, had been completely resolved. The major components were methyl N-acetyl-3,4 - O - isopropylidene - 7 - O - methyl - 7 - epi-α-thiolincosaminide and methyl N - acetyl - 3,4 - O - isopropylidene - 2 - O - methyl - 7 - epi - α - thiolincosaminide. A minor component was methyl N - acetyl-3,4 - O - isopropylidene - 2,7 - di - O - methyl - 7 - epi-α-thiolincosaminide.

(D) METHYL N-ACETYL-2-O-METHYL-7-EPI-α-THIOLINCOSAMINIDE

A mixture of 2 g. of methyl N - acetyl - 2 - O - methyl-3,4 - O - isopropylidene - 7 - epi - α - thiolincosaminide in 50 ml. of 0.25 N hydrochloric acid was magnetically stirred at room temperature (about 25° C.). The solid starting material dissolved within minutes. After 1¾ hours, thin-layer chromatography showed the complete absence of starting material.

The strongly acidic solution was stirred with a polystyrene quaternary ammonium anion exchange resin until the colorless supernatant solution gave a neutral reaction with pH paper. Filtration, washing of the resin with water, and removal of the water from the combined filtrate and washes in vacuo gave 1.68 g. (95%) of a colorless crystalline residue which was crystallized from methanol-ether to give methyl N - acetyl - 2 - O - methyl-7-epi-α-thiolincosaminide.

(E) METHYL 2-O-METHYL-7-EPI-α-THIOLINCOSAMINIDE

The thus-obtained methyl N - acetyl - 2 - O - methyl-α-thiolincosaminide was heated with 6 ml. of hydrazine hydrate under reflux for a period of 22 hours. The excess hydrazine hydrate was removed by distillation in vacuo and the residue was three times recrystallized from ethanol-water to give methyl 2 - O - methyl - 7 - epi-α-thiolincosaminide.

(F) METHYL 7-O-METHYL-7-EPI-α-THIOLINCOSAMINIDE

In the manner given in parts D and E, methyl N-acetyl-7 - O - methyl - 3,4 - O - isopropylidene - 7 - epi-α- thiolincosaminide was hydrolyzed and then hydrazinolyzed to give methyl 7 - O - methyl - epi - α - thiolincosaminide.

(G) METHYL 2,7-DI-O-METHYL-α-THIOLINCOSAMINIDE

In the manner given in parts D and E, methyl N-acetyl - 2,7 - di - O - methyl - 3,4 - O - isopropylidene-7 - epi - α - thiolincosaminide was hydrolyzed and then hydrazinolyzed to give methyl 2,7 - di - O - methyl-7-epi-α-thiolincosaminide.

By substituting the methyl 7-epi-α-thiolincosaminide by methyl 7-epi-β-thiolincosaminide or by the other alkyl epi-α- or epi-β-thiolincosaminides, the corresponding alkyl 2-O-, 7-O-, and 2,7-di-O-alkyl 7-epi-α- and 7-epi-β-thiolincosaminides are obtained.

Following the procedures of the above examples, compounds of the formula:

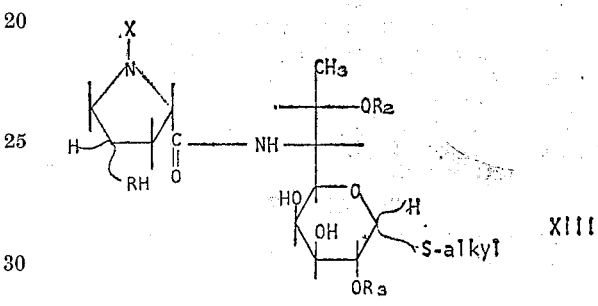

wherein X=R$_1$ or Z as given above, R is as given above, and R$_2$ and R$_3$ are hydrogen or alkyl of not more than 12 carbon atoms, are obtained.

By substituting the methyl N - acetyl - 7 - epi-α-thiolincosaminide by 2-hydroxyethyl 7-epi-α- and 7-epi-β-thiolincosaminides, the corresponding alkoxyethyl N-acetyl-2-O-, 7-O-, and 2,7-di-O-alkyl-7-epi-α- and 7-epi-β-thiolincosaminides are obtained. By substituting the methyl N acetyl - 7 - epi - α - thiolincosaminide by 2-trityloxyethyl N-acetyl-7-epi-α- and 7-epi-β-thiolincosaminides, the corresponding 2-trityloxyethyl N-acetyl-2-O-, 7-O-, and 2,7-di-O-alkyl-7-epi-α- and 7-epi-β-thiolincosaminides are obtained. By removing the trityl group by hydrolyzing with 80% aqueous acetic acid and the N-acetyl by hydrazinolysis, the corresponding 2-hydroxyethyl 2-O-, 7-O-, and 2,7-di-O-alkyl-7-epi-α- and 7-epi-β-thiolincosaminides are obtained.

By these procedures, compounds of the formula:

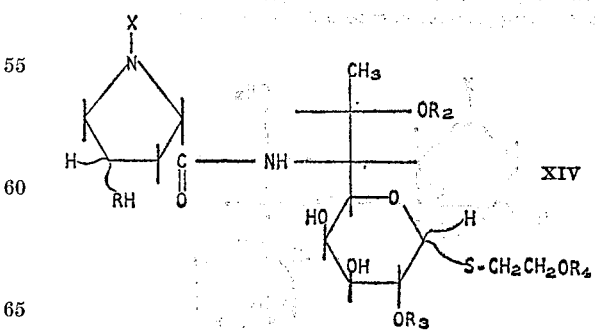

wherein X=R$_1$ or Z as given above, R and R$_4$ are as given above, and R$_2$ and R$_3$ are hydrogen or alkyl of not more than 12 carbon atoms, are obtained.

Typical compounds prepared according to the above examples include both the cis and trans forms of the following compounds according to each of Formulas XIII (α anomer) and XIII (β anomer) wherein R$_2$ and R$_3$ are hydrogen.

TABLE I

| | RH | $R_1$ | Alkyl |
|---|---|---|---|
| (a) | $CH_3$ | H | $CH_3$ |
| (b) | $CH_3$ | $CH_3$ | $CH_3$ |
| (c) | $CH_3$ | $C_2H_5$ | $CH_3$ |
| (d) | $C_2H_5$ | H | $C_2H_5$ |
| (e) | $C_2H_5$ | $C_2H_5$ | $C_2H_5$ |
| (f) | n-$C_3H_7$ | H | $C_2H_5$ |
| (g) | n-$C_3H_7$ | $CH_3$ | $C_2H_5$ |
| (h) | n-$C_4H_9$ | H | $CH_3$ |
| (i) | n-$C_4H_9$ | $CH_3$ | $CH_3$ |
| (j) | n-$C_4H_9$ | $C_2H_5$ | $C_2H_5$ |
| (k) | n-$C_4H_9$ | H | $C_2H_5$ |
| (l) | n-$C_4H_9$ | $CH_3$ | $C_2H_5$ |

Each of the above compounds has its counterpart wherein $R_6$ is methyl.

Typical compounds prepared according to the above examples include both the cis and trans forms of the following compounds according to each of Formulas XIV ($\alpha$ anomer) and XIV ($\beta$ anomer) wherein $R_2$ and $R_3$ are hydrogen.

TABLE II

| | RH | $R_1$ | $R_4$ |
|---|---|---|---|
| (a) | $CH_3$ | H | H |
| (b) | $CH_3$ | $CH_3$ | H |
| (c) | $CH_3$ | $CH_3$ | $CH_3$ |
| (d) | $C_2H_5$ | H | H |
| (e) | $C_2H_5$ | $C_2H_5$ | $C_2H_5$ |
| (f) | n-$C_3H_7$ | H | H |
| (g) | n-$C_3H_7$ | $CH_3$ | H |
| (h) | n-$C_3H_7$ | $CH_3$ | $CH_3$ |
| (i) | n-$C_4H_9$ | H | H |
| (j) | n-$C_4H_9$ | $CH_3$ | H |
| (k) | n-$C_4H_9$ | $CH_3$ | $CH_3$ |

Each of the above compounds has its counterpart wherein $R_2$ is methyl.

Typical compounds prepared according to the above examples include both the cis and trans forms of the following compounds according to Formula X.

TABLE III

| | RH | $R_1$ |
|---|---|---|
| (a) | $CH_3$ | H |
| (b) | $CH_3$ | $CH_3$ |
| (c) | $CH_3$ | $C_2H_5$ |
| (d) | $C_2H_5$ | H |
| (e) | $C_3H_5$ | $CH_3$ |
| (f) | $C_2H_5$ | $C_2H_5$ |
| (g) | n-$C_3H_7$ | H |
| (h) | n-$C_3H_7$ | $CH_3$ |
| (i) | n-$C_3H_7$ | $C_2H_5$ |
| (j) | n-$C_4H_9$ | H |
| (k) | n-$C_4H_9$ | $CH_3$ |
| (l) | n-$C_4H_9$ | $C_2H_5$ |

Each of the above compounds has its counterparts wherein the 7-O-hydrogen is replaced by methyl.

Typical compounds according to the invention prepared according to the above examples include each of the compounds listed in Tables I and II in which the 2-O-hydrogen ($R_3$), and the 7-O-hydrogen ($R_2$), and the 2-O- and 7-O-hydrogens ($R_3$ and $R_2$) are replaced by alkyl, for example, methyl, ethyl, propyl, butyl, pentyl, hexyl, heptyl, octyl, nonyl, decyl, undecyl, and dodecyl and the isomeric forms thereof.

In place of acetone in Example 1 and the examples related thereto, there can be used other oxo compounds of the formula $R_5O$ where $R_5$ is as illustrated above. Particularly good results are obtainable with benzaldehyde, anisaldehyde, and cinnamaldehyde as the 3,4-O-ylidenene group from these aldehydes are more easily removed by mild hydrolysis. Also, in place of the acetone there can be substituted a trimethyl-silylating agent whereby the 3-O- and 4-O-positions are protected by trimethylsilylether groups. In this case, if $R_3$ is hydrogen a third trimethylsilylether group is introduced in the 2-position but this comes off with the 3- and 4-positions trimethylsilylether groups on mild acid hydrolysis. The trimethylsilylation can be effected by a way already known in the art, for example, as described in U.S. Patent application Ser. No. 576,239 filed Aug. 31, 1966 (Iranian Patent 6815, Sept. 6, 1967).

The following example is illustrative.

EXAMPLE 9

*7-Epilincomycin*

(A) 2,3,4,7-TETRAKIS-O-(TRIMETHYLSILYL)-LINCOMYCIN

Ten gms. of lincomycin hydrochloride is dissolved in 100 ml. of dry pyridine and 15 ml. of hexamethyldisilazane and 2 ml. of trimethylchlorosilane is added. The reaction mixture is stirred vigorously for about 2 hours. Two hundred ml. of chloroform is dissolved in the mixture and pyridine is removed by washing with water. Recovery of the tetra(trimethylsilyl) compound is obtained by evaporation of the chloroform solution to dryness. The dry residue is dissolved in methanol-chloroform (1:40) and chromatographed over silica gel to yield an eluate from which crystalline 2,3,4,7-tetrakis-O-(trimethylsilyl)-lincomycin is obtained upon evaporation to dryness.

*Aanlysis.*—Calc'd. for $C_{30}H_{66}O_6N_2SSi_4$ (percent): C, 51.82; H, 9.57; N, 4.03; S, 4.61; M.Wt. 695. Found (percent): C, 51.65; H, 9.58; N, 4.03; S, 4.72; Eq. Wt. 700. $[\alpha]_D$ +111° (C., 1, chloroform).

(B) 2,3,4-TRIS-O-(TRIMETHYLSILYL)-LINCOMYCIN

Five gms. of 2,3,4,7-tetrakis-O-(trimethylsilyl)-lincomycin (Part A) is dissolved in 100 ml. of methanol. Five ml. of 6 N acetic acid is added and hydrolysis is followed by gas chromatography. After 48 hours the reaction is essentially complete. The trimethylsilyl compound is isolated and purified by evaporation of the methanol and acetic acid, redissolving the material in chloroform and washing with water. Thereafter the chloroform solution is filtered through silica gel to yield a filtrate which upon evaporation provides dry crystalline 2,3,4-tris-O-(trimethylsilyl)-lincomycin.

*Analysis.*—Calc'd. for $C_{27}H_{58}O_6N_2SSi_3$ (percent): C, 52.05; H, 9.38; N, 4.50; S, 5.15; M.Wt. 622.99. Found (percent): C, 52.34; H, 9.22; N, 4.32; S, 5.26; Eq.Wt. 626. $[\alpha]_D(CHCl_3) +121°$.

(C) 2,3,4-TRIS-O-(TRIMETHYLSILYL)-7-DEHYDROLINCOMYCIN

To a solution of 31.0 g. (0.05 mole) 2,3,4-tris-O-(trimethylsilyl)-lincomycin (Part B) in 120 ml. purified dimethyl sulfoxide containing 45 ml. (0.32 mole) triethylamine was added 23.9 g. (0.15 mole) of pyridine-sulfur trioxide complex in 200 ml. diethylsulfoxide. The addition required 0.5 hr. and the temperature was maintained at 25–28° C. After two hours the reaction mixture was extracted with 500 ml. Skellysolve B (technical hexane). The extract was thrice washed with 300 ml. water, then dried over magnesium sulfate. After evaporation the residue was crystallized from 50 ml. ethanol and 10 ml. water, yielding 18.3 g. of 2,3,4-tris-O-(trimethylsilyl)-7-dehydrolincomycin, melting 147–50° C.

*Analysis.*—Calc'd. for $C_{27}H_{56}N_2O_6SSi_3$ (percent): C, 52.21; H, 9.09; S, 5.16; N, 4.51. Found (percent): C, 52.17; H, 9.04; S, 5.32; N, 4.68.

(D) 2,3,4-TRIS-O-(TRIMETHYLSILYL)-7-EPILINCOMYCIN

To two grams (0.0032 mole) 2,3,4-tris-O-(trimethylsilyl)-7-dehydrolincomycin (Part C) in 200 ml. abs. ethanol was added 500 mg. platinum oxide (Adam's) catalyst. This was then shaken at 30–40 p.s.i.g. hydrogen for 2 hours. The crude product was recovered by filtration to remove catalyst and evaporation of the filtrate. This was chromatographed in 200 g. silica gel (Darmstadt) in a 1.25" column, 10 ml. fractions, acetone-1:Skellysolve B 0.4. The residue of tubes 18–30, 530 mg., was crystallized from Skellysolve B yielding 2,3,4-tris-O-(trimethylsilyl)-7-epilincomycin, M.P. 156–157° C.

Analysis.—Calcd. for $C_{27}H_{58}N_2O_6SSi_3$ (percent): C, 52.05; H, 9.38; N, 4.50; S, 5.15. Found (percent): C, 52.30; H, 9.03; N, 4.50; S, 5.12; $\alpha D[C=1, CHCl_3]+111°$.

The product from tubes 38–65 (1.4 g.) was crystallized from Skellysolve B and found to be 2,3,4-tris-O-(trimethylsilyl)-lincomycin by comparison with an authentic sample.

(E) ON HYDROLYSIS OF 2,3,4-TRIS - O - (TRIMETHYL-SILYL)-7-EPILINCOMYCIN (PART D) BY THE PROCEDURE OF EXAMPLE 1, PART D, 7-EPILINCOMYCIN IS OBTAINED

This process has the advantage that the intermediate products produced in steps C and D are crystalline and therefore more easily recovered from the reactions. The oxidizing procedures in step C is known as the Moffet oxidation. The oxidizing agent is dimethylsulfoxide activated by an acidic catalyst. It can be substituted by the chromic acid procedure of Example 1 and vice versa. Also the catalytic hydrogenation of Part D can be substituted by the borohydride reduction of Example 1 and vice versa.

I claim:

1. A compound of the formula:

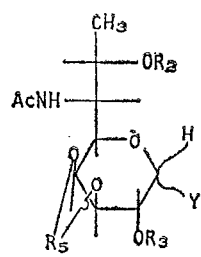

and acid addition salts wherein $R_2$ and $R_3$ are hydrogen or alkyl of not more than 12 carbon atoms; Y is a member of the group consisting of hydrogen, —S-alkyl of not more than 12 carbon atoms, —SCH$_2$CH$_2$OH, and —SCH$_2$CH$_2$O-alkyl wherein the alkyl is of not more than 12 carbon atoms; $R_5$ is alkylidene, cycloalkylidene, or aralkylidene or two trimethylsilyl groups in which case $R_3$ is alkyl or trimethylsilyl but not hydrogen; and Ac is a member of the group consisting of alkanoyl and aralkanoyl of not more than 12 carbon atoms and acyl of the formula:

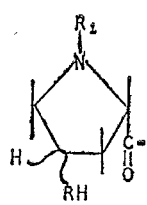

wherein R is alkylidene of not more than 20 carbon atoms, cycloalkylidene of 3 to not more than 8 carbon atoms or aralkylidene of not more than 12 carbon atoms and $R_1$ is hydrogen, alkyl of not more than 20 carbon atoms, cycloalkyl of 3 to not more than 8 carbon atoms, or aralkyl of not more than 12 carbon atoms.

2. A compound according to claim 1 wherein $R_5$ is isopropylidene.

3. A compound according to claim 1 have the formula:

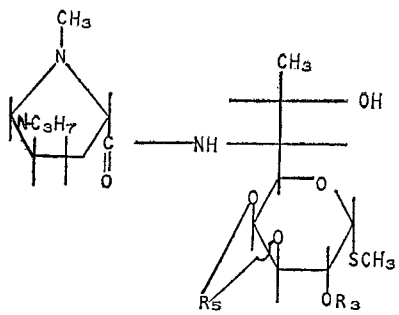

and acid addition salts wherein $R_3$ and $R_5$ are as given in claim 1.

4. A compound according to claim 3 wherein $R_5$ is isopropylidene, and $R_3$ is hydrogen.

5. A compound having the formula:

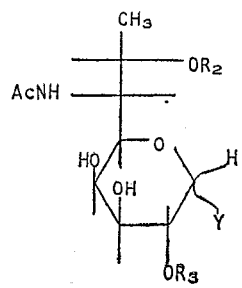

and acid addition salts wherein Ac, $R_2$, $R_3$ and Y are as given in claim 1.

6. A compound according to claim 5 having the formula:

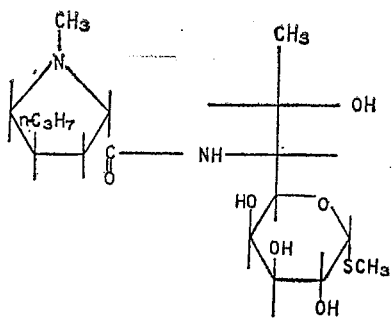

and acid additions salts.

7. A compound having the formula:

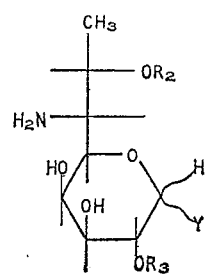

and acid addition salts wherein $R_2$, $R_3$, and Y are as given in claim 1.

8. A compound according to claim 7 having the formula:

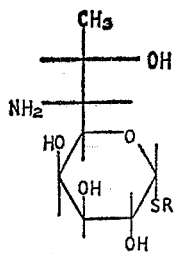

and acid addition salts wherein R is alkyl of not more than 12 carbon atoms.

9. A compound according to claim 8 wherein R is methyl.

10. A compound having the formula:

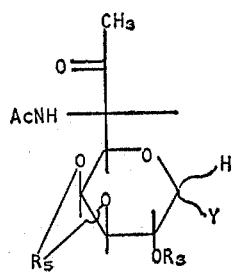

and acid addition salts wherein Ac, $R_3$, $R_5$, and Y are as given in claim 1.

11. A compound according to claim 10 in which $R_5$ is isopropylidene.

12. A compound according to claim 10 having the formula:

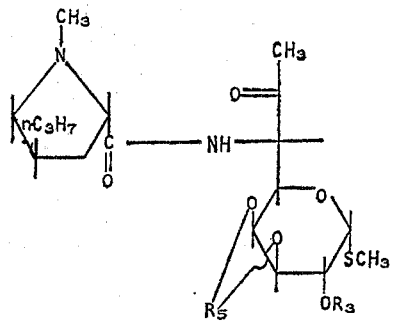

and acid addition salts wherein $R_3$ and $R_5$ are as given in claim 1.

13. A compound according to claim 12 in which $R_5$ is isopropylidene, and $R_3$ is hydrogen.

14. A process which comprises reacting a compound of formula:

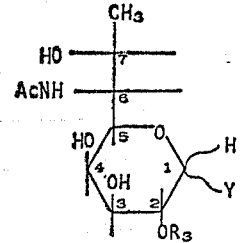

with an oxo compound to protect the 3-O- and 4-O- positions, oxidizing with chromic acid to convert the 7-hydroxy group to an oxo group, reducing the 7-oxo group with borohydride to a hydroxy group and removing the 3-O- and 4-O-protection by acid hydrolysis to form a compound of the formula:

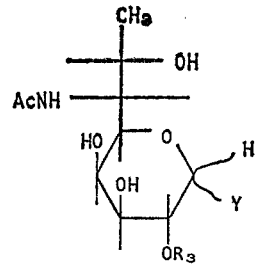

wherein Ac is acyl, $R_3$ is hydrogen or alkyl, and Y is hydrogen, —S-alkyl, —SCH$_2$CH$_2$OH, or —SCH$_2$CH$_2$O-alkyl.

15. The process of claim 14 in which the resulting compound is subjected to hydrazinolysis to form a compound of the formula:

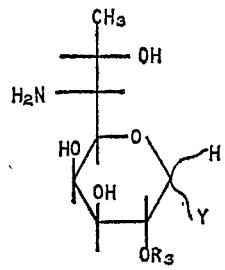

16. A process which comprises reacting a compound of formula:

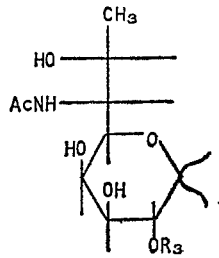

with an oxo compound of the formula $R_5O$ wherein $R_5$ is alkylidene, cycloalkylidene or aralkylidene to form a compound of the formula:

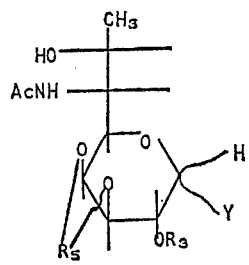

oxidizing the resulting compound to form a compound of the formula:

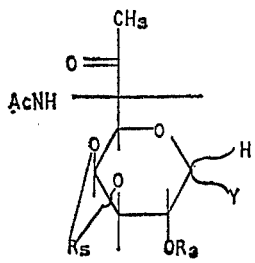

reducing the obtained compound to a compound of the formula:

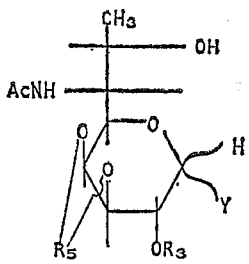

and removing the group $R_5$ by acid hydrolysis, to form a compound of the formula:

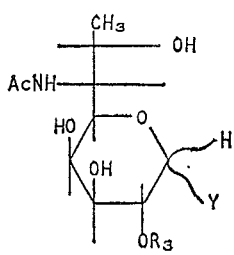

wherein $R_3$ is a member of the group consisting of hydrogen and alkyl of not more than 12 carbon atoms; Ac is a member of the group consisting of alkanoyl and aralkanoyl of not more than 12 carbon atoms and acyl of the formula:

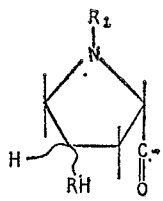

wherein R is a member of the group consisting of alkylidene of not more than 20 carbon atoms, cycloalkylidene of 3 to not more than 8 carbon atoms and aralkylidene of not more than 12 carbon atoms and $R_1$ is a member of the group consisting of hydrogen, alkyl of not more than 20 carbon atoms, cycloalkyl of 3 to not more than 8 carbon atoms, and aralkyl of not more than 12 carbon atoms; and Y is a member of the group consisting of hydrogen, —S-alkyl of not more than 12 carbon atoms, —SCH$_2$CH$_2$OH, and —SCH$_2$CH$_2$O-alkyl wherein the alkyl is of not more than 12 carbon atoms.

17. The process of claim 16 in which $R_5$ is isopropylidene.

18. A process which comprises reacting a compound of formula:

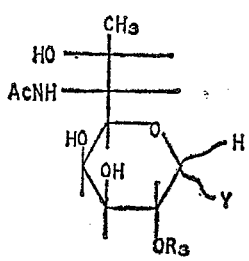

with an oxo compound of the formula $R_5O$ where $R_5$ is alkylidene, cycloalkylidene, or aralkylidene to form a compound of the formula:

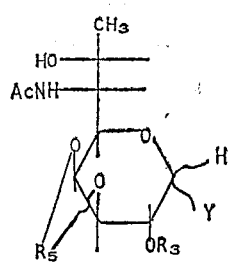

oxidizing the resulting compound to form a compound of the formula:

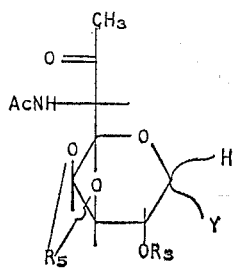

wherein Ac and $R_3$ are as given in claim 14.

19. The process of claim 18 in which the obtained compound is reduced with borohydride or catalytically hydrogenated to form a compound of the formula:

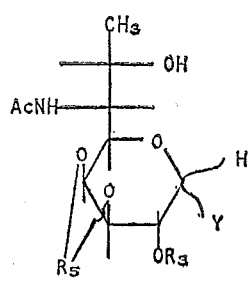

20. A compound according to claim 1 wherein $R_5$ is two trimethylsilyl groups and $R_3$ is trimethlysilyl.

21. A compound according to claim 3 wherein $R_5$ is two trimethylsilyl groups and $R_3$ is trimethylsilyl.

22. A compound according to claim 10 wherein $R_5$ is two trimethylsilyl groups and $R_3$ is trimethylsilyl.

23. A compound according to claim 12 wherein $R_5$ is two trimethylsilyl groups and $R_3$ is trimethylsilyl.

24. The process according to claim 16 wherein $R_5$ is two trimethylsilyl groups and $R_3$ is trimethylsilyl.

25. The process according to claim 18 wherein $R_5$ is two trimethylsilyl groups and $R_3$ is trimethylsilyl.

26. The process according to claim 19 wherein $R_5$ is two trimethylsilyl groups and $R_3$ is trimethylsilyl.

References Cited

UNITED STATES PATENTS

| | | | |
|---|---|---|---|
| 3,352,849 | 11/1967 | Shen et al. | 260—211.5 |
| 3,354,160 | 11/1967 | Duschinsky et al. | 260—211.5 |
| 3,366,624 | 1/1968 | Argoudelis et al. | 260—210 |
| 3,380,992 | 4/1968 | Argoudelis et al. | 260—210 |

LEWIS GOTTS, Primary Examiner

J. R. BROWN, Assistant Examiner

U.S. Cl. X.R.

252—357; 260—326.3, 999

UNITED STATES PATENT OFFICE
CERTIFICATE OF CORRECTION

Patent No. 3,514,440　　　　　　　　Dated May 26, 1970

Inventor(s)　　　　　　Herman Hoeksema

It is certified that error appears in the above-identified patent and that said Letters Patent are hereby corrected as shown below:

Column 4, line 35, "asd" should read --and--. Column 5, line 11, "ether" should read --either--; line 28, "$[\alpha]^{25}$" should read --$[\alpha]_D^{25}$--. Column 7, line 48, "present" should read --parent--. Column 9, line 51, "4-hexyl-" should read -- 4-pentyl- --; line 57, "of ___-(4-" should read -- of N-(4- --. Column 10, lines 31-34, "cyclobutylethyl, cyclobutyl, cyclohexyl, and 4-methyl-(2,2-dimethyl-cyclopropyl)ethyl, 1-cyclopentylethyl, 1-cyclobutyl-ethyl, cyclobutyl, cyclohexpl, and 4-methyl-" should read --cyclo-heptylmethyl, 2-(2,2-dimethylcyclopropyl)ethyl, 1-(2,2-dimethyl-cyclopropyl)ethyl, 1-cyclopentylethyl, 1-cyclobutylethyl, cyclo-butyl, cyclohexyl, and 4-methyl- --. Column 11, line 68, "permanganate is solution." should read --permanganate solution--. Column 20, line 1, "have" should read --having--.

Signed and sealed this 7th day of September 1971.

(SEAL)
Attest:

EDWARD M. FLETCHER, JR.　　　　　ROBERT GOTTSCHALK
Attesting Officer　　　　　　　　Acting Commissioner of Patents